Jan. 29, 1924.  1,482,284
J. H. CARNEY ET AL
OPERATING MECHANISM FOR CONCENTRATING TABLES AND THE LIKE
Filed Nov. 4, 1922
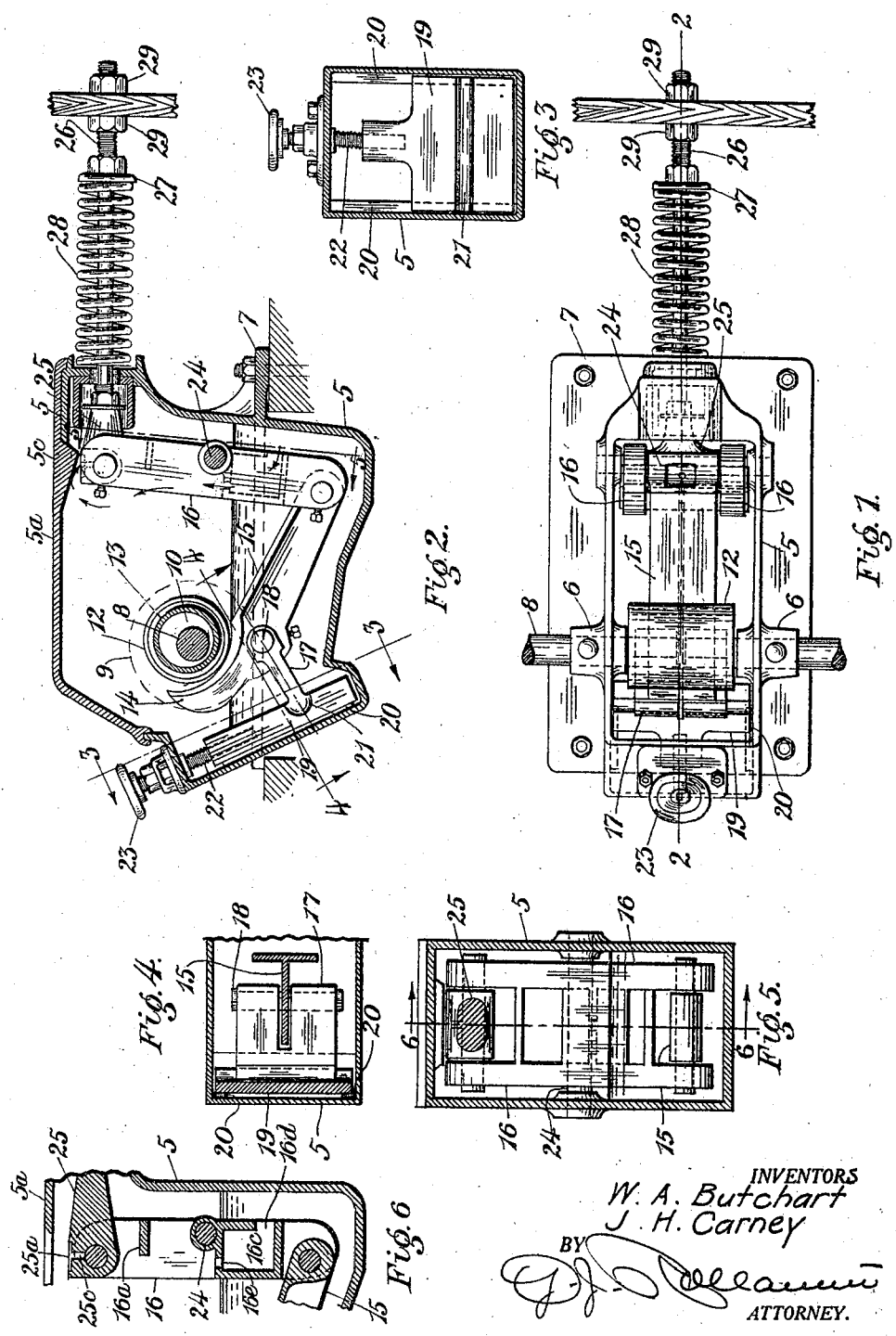
INVENTORS
W. A. Butchart
J. H. Carney
BY
ATTORNEY.

Patented Jan. 29, 1924.

1,482,284

UNITED STATES PATENT OFFICE.

JAMES HOWARD CARNEY AND WILLIAM A. BUTCHART, OF DENVER, COLORADO; SAID CARNEY ASSIGNOR TO SAID BUTCHART.

OPERATING MECHANISM FOR CONCENTRATING TABLES AND THE LIKE.

Application filed November 4, 1922. Serial No. 599,121.

*To all whom it may concern:*

Be it known that we, JAMES HOWARD CARNEY and WILLIAM A. BUTCHART, citizens of the United States, residing at Denver, in the county of Denver and State of Colorado, have invented certain new and useful Improvements in Operating Mechanism for Concentrating Tables and the like, of which the following is a specification.

Our invention relates to drive mechanisms for concentrating tables, screens and other reciprocating devices, and more particularly to mechanical movements of this type which in their operation produce a differential reciprocating motion in which the differential is proportionate to the length of the stroke.

It is an object of the present invention to provide a mechanism of the above character in which simplicity of construction, rigidity and strength are combined with efficiency and practicability in use; another object of the invention is to provide in a drive mechanism of the type above referred to, an oil reservoir for the automatic lubrication of the moving parts and in operative relation thereto, a means whereby one of said parts is automatically lubricated at a point above the liquid level when the mechanism is in operation; a further object is to provide an arrangement of co-operating parts by which detrimental vibration, friction and stresses are reduced to a minimum, and to provide a simple, durable and easily operated adjustment of the length of the stroke; and still another object of our invention is to produce an arrangement of parts by which their weight as well as the operating strains are below the drive shaft and eccentric which impart movement to the mechanism, and to lower the center of gravity of the device for the purpose of securing stability and absorbing vibrations in the supporting base or foundation.

With the above and other objects in view our invention consists of the construction and arrangement of parts illustrated in a preferred form in the accompanying drawings and hereinafter described with reference thereto.

In the drawings in the several views of which like parts are similarly designated:

Figure 1 represents a plan view of our improved driving mechanism;

Figure 2, a vertical section on the line 2—2, Figure 1;

Figure 3, a section on the line 3—3, Figure 2;

Figure 4, a fragmentary section taken along the line 4—4, Figure 2;

Figure 5, a section on the line 5—5, Figure 2; and

Figure 6, a section taken on the line 6—6, Figure 5.

Referring more specifically to the drawings, the reference character 5 designates a base or frame within which the parts of the mechanism are co-operatively assembled, and which in practice is supported upon and fastened to a suitable foundation forming no part of the present invention and consequently not fully shown.

The frame consists of a heavy hollow casting provided with bearings 6 for the drive shaft of the mechanism and having outwardly projecting lugs 7 for its attachment to the foundation. The frame is closed at its top by a cover-member 5$^a$ to exclude dust and dirt from the mechanism it encloses.

The drive shaft 8 supported in the bearings is connected with a conveniently located source of energy by means of a pulley indicated in Figure 2 by broken lines as at 9, or other suitable means, and it carries intermediate of its bearings an eccentric 10.

A collar 12 preferably provided with a bushing 13 of anti-friction metal is rotatably fitted to the eccentric and bears upon the curved working face 14 of a floating toggle member 15 which connects with the lower arm of a rocking lever 16.

A second toggle member 17 which straddles a web on the lower side of the floating member of the toggle, is pivotally connected therewith through the medium of a short shaft 18 and it bears upon an abutment block 19 which is slidably fitted in a guide way 20 at the rear end of the supporting frame 5.

The abutment block has a concave seat 21 in which the convex end of the toggle 17 movably engages and it connects for its upward and downward adjustment with a screw 22 which is rotatably but longitudinally immovably supported on the frame 5.

The screw is provided at its upper end with a hand wheel 23 to facilitate manual rotation.

The rocker lever 16 which as stated before, is at its lower extremity in pivotal connection with the floating toggle member 15, is fulcrumed near its center upon a transverse shaft 24 carried by the frame 5 and it connects at its upper end with the head 25 of a pull rod 26 passing through an opening in the front of the frame.

The pull rod 26 is provided with an adjustable collar 27 to engage the end of a compression spring 28 through which the pull rod passes and which at its opposite end bears in a circular seat on the front wall of the frame 5.

Two nuts 29 on the screw-threaded free end of the pull rod 26 provide means for attaching it to the concentrating table, screen or other reciprocating device to which the movement is to be applied.

The base or frame 5 of the mechanism is closed at the bottom to constitute an oil receptacle which will contain a considerable quantity of lubricant in which the pivotal points of the toggle and therewith associated parts are submerged.

The rocker lever 16 is composed of two side members which above its fulcrum, are spaced apart by an integral web 16ª.

In the lower portion of the lever, below the liquid level, is formed a pocket 16ᶜ which is completely closed except for a slot 16ᵈ near the bottom of its side facing the wall of the frame 5, and an outlet opening or nozzle 16ᵉ in its upper wall, which communicates with the space between the upper portions of the side members of the lever hereinbefore referred to.

It will be noted that the floating toggle member 15 has no fixed bearing, but is carried by two other moving parts, the rocker lever 16 and the toggle member 17. The oscillating end of the toggle member 17, which supports the floating member near its center, moves in the arc of a circle of which the fixed bearing in the abutment block is the center. The attached end of the floating member being pivoted at the lower end of the rocker lever 16, is restricted to move in an arc of determinate radius about the fulcrum thereof and its opposite end, supported by the toggle member 17, is free to move with the latter in a circularly downward direction.

In operation, the rotation of the eccentric causes a circularly or diagonally downward movement of the free end of the floating toggle member by engagement with the working face thereof, such movement being converted into a longitudinal travel of the member owing to the contact of the other toggle-member with the relatively stationary seat on the abutment block 19. This longitudinal movement is transmitted to the lower end of the rocker arm and by it to the pull rod and the therewith connected table, screen or other device.

Owing to the difference in the radii of the collar on the eccentric and of the curved face of the floating member with which it engages, the point of contact between the eccentric and the working face of the floating member is constantly changing throughout the stroke, whereby the reciprocating movement of the pull rod is accelerated toward one end of the stroke and retarded near the other, with the result that a differential or variable movement is imparted to the operated table or other device to which the rod is attached. Particles of material fed onto the surface of the table or screen are in consequence of the above described differential movement caused to move intermittently thereon from the feed end toward the discharge end.

Raising or lowering the abutment block changes the working angle between the centers of the bearings of the members of the toggle, thereby varying the length of the stroke or movement imparted to the pull rod, and as the ratio of the differential movement is fixed by the construction and relative dimensions of the various parts of the mechanism, it is evident that the differential action is proportionate to the length of the stroke.

The working parts are necessarily of considerable weight in order to secure the required strength, and by placing them below the eccentric, the latter is relieved of the additional load which would be placed upon it if the parts were above its axis of rotation.

The arrangement also utilizes the weight of the parts toward counterbalancing that of the table or screen to be moved and in compressing the spring, thereby causing a more even distribution of load or strains between the forward and backward movements. Placing the heavy working parts below the point at which power is applied, furthermore lowers the center of gravity of the entire mechanism and largely overcomes the vibrations and excessive strains upon the supporting frame and bolts by which it is fastened upon its foundations.

The arrangement of the parts as shown and described, also makes possible the use of the sliding abutment block which provides a very simple and positive means for the ready adjustment of the length of the stroke.

When the operating mechanism is in motion, the eccentric, dipping into the oil contained in the casing at each revolution, is constantly lubricated and the splashing effect caused by the movement of the parts also throws oil into the main bearings 6 and upon the shaft 24 of the rocker lever 16.

The shaft pivoting the head 25 to the rocker lever 16 is however, elevated above the level of the oil to such a height that no oil is splashed upon it and since the casing is completely closed, it is essential to provide other dependable means for its automatic lubrication.

These means are provided by the above described pocket 16ᶜ in the lower portion of the lever which being submerged in the oil, is filled with the lubricant. Movement of the lower arm of the lever toward the wall of the casing 5 causes pressure to be exerted upon the oil in the pocket through the slot 16ᵈ with the result that the oil confined in the pocket is forced upwardly through the outlet opening 16ᵉ at each stroke of the lever, in a jet which rises to a height above that of the bearing to be lubricated.

The direction of the jet is such that the oil falls upon the head 25 which is provided with a depression 25ᵃ and openings 25ᶜ through which the liquid passes to the pivot pin which connects the head with the lever. A deflecting surface 5ᶜ on the cover member 5ᵃ aids by deflection in directing the jet to the depression.

The above described arrangement produces a very efficient oiling device having no parts in frictional contact and therefore not subject to wear.

Having thus described our invention, what we claim and desire to secure by Letters Patent is:

1. In a mechanism of the character described, a hollow frame closed at its bottom to provide an oil reservoir, a toggle in said reservoir below a determinate liquid level, including a floating member having an upturned working face, a rocker-lever connected with said member below its fulcrum, an abutment for the toggle, a movement-transmitting element, a pivotal connection between said element and the upper end of the lever above said liquid level, the lever having means which by its rocking motion, causes the lubricant in the reservoir to be forced upwardly so as to lubricate the said connection, and an eccentric rotatably supported on the frame above and in contact with the working face of the floating toggle member.

2. In a mechanism of the character described, a hollow frame closed at its bottom to provide an oil reservoir, a toggle in said reservoir below a determinate liquid level, including a floating member having an upturned working face, a rocker-lever connected with said member below its fulcrum, an abutment for the toggle, a movement-transmitting element, a pivotal connection between said element and the upper end of the lever above said liquid level, the lever having in its lower portion, a pocket provided with an inlet opening beneath said liquid level and facing in the direction of its rocking motion, and an outlet opening above the liquid level and facing upwardly to direct jets of lubricant ejected from the pocket, to said connection, and an eccentric rotatably supported on the frame above and in contact with the working face of the floating toggle member.

3. In a mechanism of the character described, a hollow frame closed at its bottom to provide an oil reservoir, a toggle in said reservoir below a determinate liquid level, including a floating member having an upturned working face, a rocker-lever connected with said member below its fulcrum, an abutment for the toggle, a movement-transmitting element, a pivotal connection between said element and the upper end of the lever above said liquid level, the lever having in its lower portion, a pocket provided with an inlet opening beneath said liquid level and facing in the direction of its rocking motion, and an outlet opening above the liquid level and facing upwardly for the ejection of upwardly directed jets of lubricant, and the frame having a surface adapted to direct said jets of lubricant by deflection, to said connection, and an eccentric rotatably supported on the frame above and in contact with the working face of the floating toggle member.

4. In mechanism of the character described, the combination with a reservoir and a lubricant liquid therein, of a rocker lever having a pocket provided with an inlet opening below the level of the liquid and facing in the direction of the rocking motion, and with an outlet opening above the liquid level and facing upwardly for the ejection of upwardly directed jets of lubricant.

5. In a mechanism of the character described, the combination with a reservoir and a lubricant liquid therein, of a rocker lever moving about a horizontal axis, and a pivotal connection at the upper end thereof, the lever having a pocket provided with an inlet opening below the level of the liquid and facing in the direction of the rocking motion, and an outlet opening above the liquid level and facing upwardly to direct jets of lubricant ejected from the pocket to said connection.

In testimony whereof we have affixed our signatures.

JAMES HOWARD CARNEY.
WILLIAM A. BUTCHART.